US008519938B2

(12) United States Patent
Hernandez et al.

(10) Patent No.: US 8,519,938 B2
(45) Date of Patent: Aug. 27, 2013

(54) INTELLIGENT AUTOMATIC BACKLIGHT CONTROL SCHEME

(75) Inventors: Thomas J. Hernandez, Portland, OR (US); Karthik Rishi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1096 days.

(21) Appl. No.: 11/949,412

(22) Filed: Dec. 3, 2007

(65) Prior Publication Data

US 2009/0140971 A1 Jun. 4, 2009

(51) Int. Cl.
*G09G 3/36* (2006.01)
*G09G 3/34* (2006.01)
*G06F 3/038* (2013.01)
*G09F 13/04* (2006.01)

(52) U.S. Cl.
USPC ............. 345/102; 345/84; 345/207; 362/97.1

(58) Field of Classification Search
USPC .................... 345/102, 77, 207, 211–212, 84; 362/97.1–97.3
See application file for complete search history.

(56) References Cited

U.S. PATENT DOCUMENTS

| | | | | |
|---|---|---|---|---|
| 5,760,760 | A * | 6/1998 | Helms | 345/102 |
| 6,078,302 | A * | 6/2000 | Suzuki | 345/102 |
| 6,094,185 | A * | 7/2000 | Shirriff | 345/102 |
| 7,236,154 | B1 * | 6/2007 | Kerr et al. | 345/102 |
| 7,268,775 | B1 * | 9/2007 | Gettemy | 345/204 |
| 2006/0256067 | A1 | 11/2006 | Montero et al. | |
| 2008/0165115 | A1 * | 7/2008 | Herz et al. | 345/102 |

FOREIGN PATENT DOCUMENTS

| | | | |
|---|---|---|---|
| KR | 10-2007-0080399 | A | 8/2007 |
| WO | 2006/129627 | A1 | 12/2006 |

OTHER PUBLICATIONS

Office Action Received for Chinese Patent Application No. 200810183697.5 mailed on Dec. 21, 2010, 20 Pages of Office Action including 8 pages of English Translation.
Office Action received for Chinese Patent Application No. 200810183697.5, mailed on Jul. 30, 2010, 24 pages of Chinese Office Action, including 15 pages of English translation.
Office Action Received for Chinese Patent Application No. 200810183697.5, Mailed on Mar. 31, 2012, 9 pages of office Action including 5 pages of English translation.
Office Action Received for Chinese Patent Application No. 200810183697.5, mailed on Mar. 31, 2011,15 pages including 9 pages of English Translation.

* cited by examiner

*Primary Examiner* — Lun-Yi Lao
*Assistant Examiner* — Jarurat Suteerawongsa
(74) *Attorney, Agent, or Firm* — Lynch Law Patent Group, P.C.

(57) ABSTRACT

A method of adjusting intensity of illumination of a device based on change in ambient light, the method comprising: measuring a first level of ambient light for a device, in response to detecting a change in ambient light; adjusting intensity of illumination for the device to a first illumination level, if an association between the first illumination level and the first level of ambient light is recorded in a data structure; monitoring user interaction with the device within a threshold period after detecting the change in ambient light to determine whether the user adjusts the intensity of illumination for the device to a second illumination level; and recording an association between the second illumination level and the first level of ambient light in the data structure.

10 Claims, 4 Drawing Sheets

INTELLIGENT AUTOMATIC BACKLIGHT CONTROL SCHEME

TECHNICAL FIELD

This invention relates generally to backlight settings for display screens and, more particularly, to intelligently enhancing and personalizing automatic backlight control schemes.

BACKGROUND

Electronic devices with display screens may use backlight to help illuminate the display. Backlight refers to light originating from the back or from the sides of a display screen. Devices with backlight, especially portable devices with power management features, may also have a backlight control feature to adjust the backlight.

Automatic backlight control allows a device to automatically adjust backlight when changes in ambient light are detected by a light sensor. For example, backlight intensity may be increased to retain readability in a brighter ambient light environment, while backlight intensity may be decreased to minimize power consumption in a darker ambient light environment.

Backlight is adjusted according to backlight settings that map ambient light values to backlight intensities. These backlight settings are usually stored in firmware (where storage is limited) and updated at the time of manufacturing. This makes it difficult for anyone but the device's integrator to add backlight settings. An integrator is someone who assembles parts (e.g., processor, graphics card, display, etc.) together into one device before selling the device to a user. Once the device is sold to a user, backlight settings for the device typically cannot be updated by the user, who may not have the understanding, motivation, or patience for selecting an optimal settings list, especially when personal preferences or personal usage patterns change sufficiently to warrant an ongoing need to alter stored settings.

Unfortunately, integrators are forced to guess what the best backlight settings are based on personal experience or average user statistics. Such settings may reflect neither actual user preferences nor optimal power management for a device and could potentially become stale (i.e. never used for the particular user's usage pattern). Systems and methods are needed to intelligently enhance and personalize automatic backlight control schemes.

BRIEF DESCRIPTION OF THE DRAWINGS

Embodiments of the invention are understood by referring to the figures in the attached drawings, as provided below.

Features, elements, and aspects of the invention that are referenced by the same numerals in different figures represent the same equivalent, or similar features, elements, or aspects, in accordance with one or more embodiments.

DETAILED DESCRIPTION OF EXEMPLARY EMBODIMENTS

The present disclosure is directed to systems, methods, and corresponding products that intelligently enhance and personalize automatic backlight control schemes.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method of adjusting intensity of illumination of a device based on changes in ambient light is provided. The method comprises measuring a first level of ambient light for a device, in response to detecting a change in ambient light; adjusting intensity of illumination for the device to a first illumination level, if an association between the first illumination level and the first level of ambient light is recorded in a data structure; monitoring user interaction with the device within a threshold period after detecting the change in ambient light to determine whether the user adjusts the intensity of illumination for the device to a second illumination level; and recording an association between the second illumination level and the first level of ambient light in the data structure.

An automatic backlight control method, in accordance with another embodiment is also provided. The method comprises detecting a change in ambient light conditions based on data provided by an ambient light sensor; adjusting intensity of a backlight based on the ambient light conditions according to first backlight setting values stored in a data structure, if any, wherein said first backlight setting values correspond to the data provided by the ambient light sensor; monitoring user interaction conducive to adjusting the intensity of backlight within a threshold time period after detecting the change in ambient light conditions; storing, in the data structure, second backlight setting values that correspond to the data provided by the ambient light sensor, wherein the second backlight setting values are determined based on the adjustment, if any, made by the user to the intensity of the backlight within said threshold time period.

Figure 1:
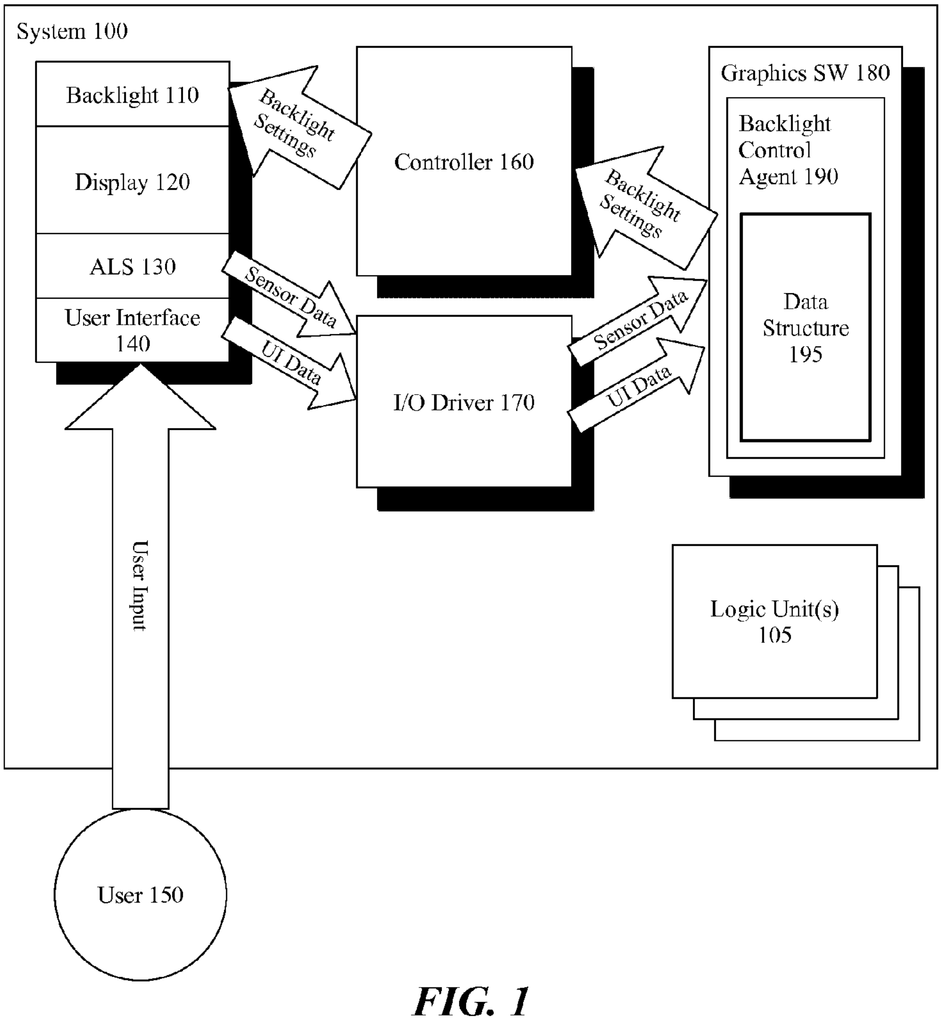
FIG. 1 is a block diagram of system components for adjusting backlight in an exemplary computing system, in accordance with one embodiment.

In accordance with another embodiment, a system comprising one or more logic units is provided. For example, system 100 may include one or more logic units 105 as shown in FIG. 1. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments, in addition to certain alternatives, are provided in further detail below with reference to the attached figures. The invention is not, however, limited to any particular embodiment enclosed.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Referring to FIG. 1, in one embodiment, exemplary system 100 comprises backlight 110, display 120, ambient light sensor (ALS) 130, user interface 140, controller 160, I/O driver 170, graphics software (SW) 180, and backlight control agent 190. Backlight 110 may be coupled to display 120, ALS 130, and user interface 140. User interface 140 may be a control button, a key on a keyboard, a soft key graphically displayed on a screen, or other mechanism responsive to user interaction. Backlight control agent 190 may be a part of graphics software 180 and may comprise data structure 195.

I/O driver 170 may be comprised of some combination of embedded controller (EC) devices, advanced control program interface (ACPI) code, video basic input/output system (BIOS), and device drivers designed to read user input data directly from hardware input ports. Graphics SW 180 may be comprised of configuration programs and graphics drivers designed to control the graphics hardware (e.g., graphics engine, display, backlight).

In another embodiment, backlight control agent 190 may be implemented as part of another component of system 100, and data structure 195 may be stored in any type of memory (e.g., non-volatile memory). Data structure 195 may be implemented as a data table, for example. Depending on implementation, arrays, linked lists, vectors, pointers, or other suitable data structures may also be used. In some embodiments, separate data structures 195 may be utilized for different user profiles.

Referring back to FIG. 1, ALS 130 may gather information (i.e., sensor data) about the light ambient to system 100 during different time intervals and in response to user interaction with user interface 140. I/O driver 170 may gather and forward sensor data corresponding to ambient light conditions or data generated from user interaction with user interface 140 (i.e. UI data) to graphics SW 170 where backlight control agent 190 may handle adjustments to backlight 110 using backlight settings stored in data structure 195. If backlight control agent 190 determines that backlight 110 needs to be adjusted, controller 160 may adjust backlight 110, as provided in more detail below.

Figure 2:
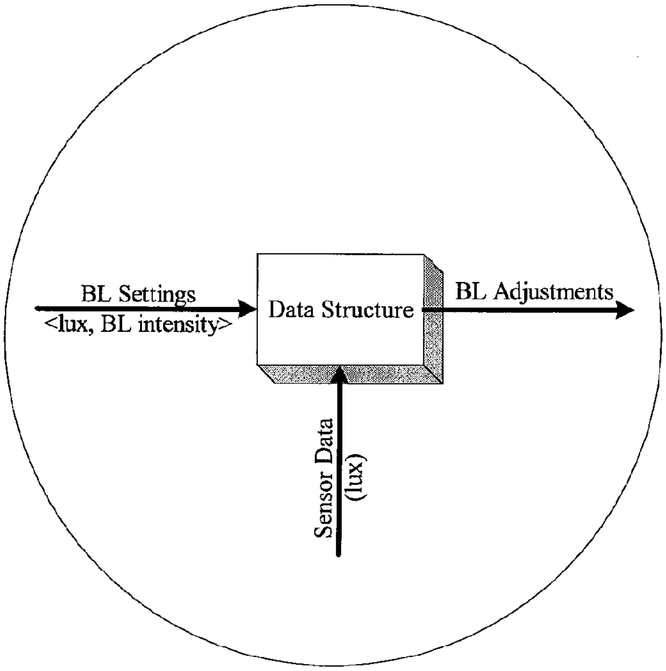
FIG. 2 is an exemplary representation of input and output to an automatic backlight control data structure, in accordance with one embodiment.

Backlight control agent 190 is a learning agent that dynamically populates data structure 195 and uses data structure 195 to intelligently adjust backlight 110. Referring to FIG. 2, data structure 195 stores backlight settings, by mapping lux values to backlight intensity values. "Lux" is the unit of measurement for ambient light. Lux values are determined by sensor data from ALS 130 and may be used to look up backlight intensity values in data structure 195.

Figure 3:
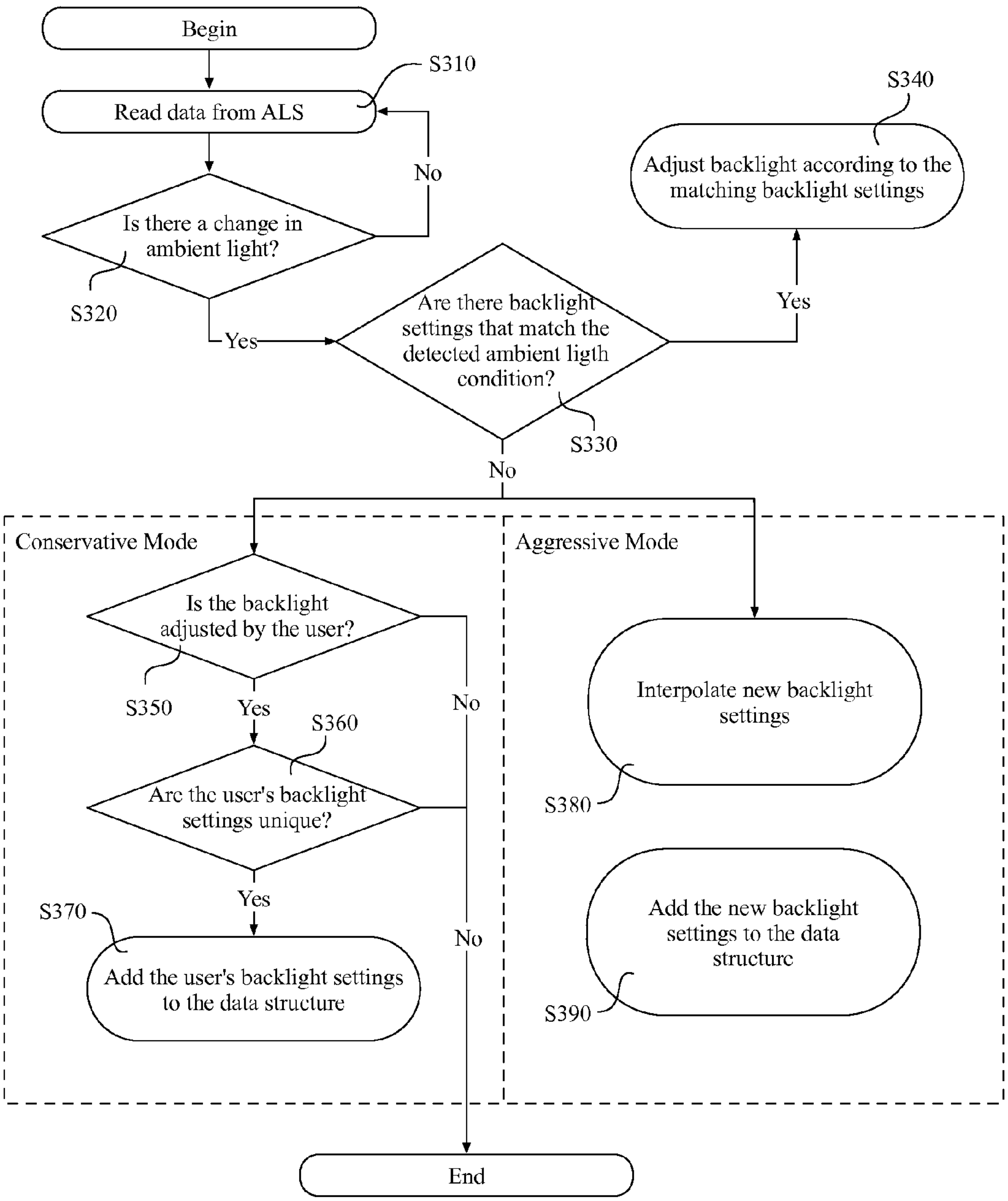
FIG. 3 is a flow diagram of a method for automatic backlight control, in accordance with one embodiment.

Referring to FIGS. 1 through 3, in one embodiment, I/O driver 170 reads sensor data from ALS 130 (S310). The frequency with which sensor data is read (i.e., the polling rate) may be changed to balance consumption of system 100's power resources against responsiveness to changes in ambient light. Once I/O driver 170 detects a change in ambient light (S320), sensor data for the detected ambient light condition is forwarded to backlight control agent 190.

If there are backlight settings in data table 195 that match (or approximately match) the detected ambient light condition (S330), backlight 110 is adjusted according to the matching backlight settings (S340). Backlight settings match the detected ambient light condition, if the lux value for the backlight settings is within a preset tolerance (e.g., within x lux units) of the detected ambient light condition. If matching backlight settings cannot be found in data structure 195, different actions may be taken depending on the mode backlight control agent 190 is in. Such modes may be set by user 150 selectively or by the manufacturer.

In a first mode (e.g., conservative mode), no action is taken unless user 150 interacts with user interface 140 to adjust backlight 110, for example, within a threshold period after which a change in ambient light is detected. If no action is taken by user 150 during the threshold time period, it is assumed that backlight 110 does not need to be adjusted. If within the threshold time period, user 150 interacts with user interface 140 and manually adjusts backlight 110 (S350), backlight control agent 190 adds user 150's backlight settings for the detected ambient light condition to data table 195 (S370) if the backlight settings are unique (S360).

Figure 4:
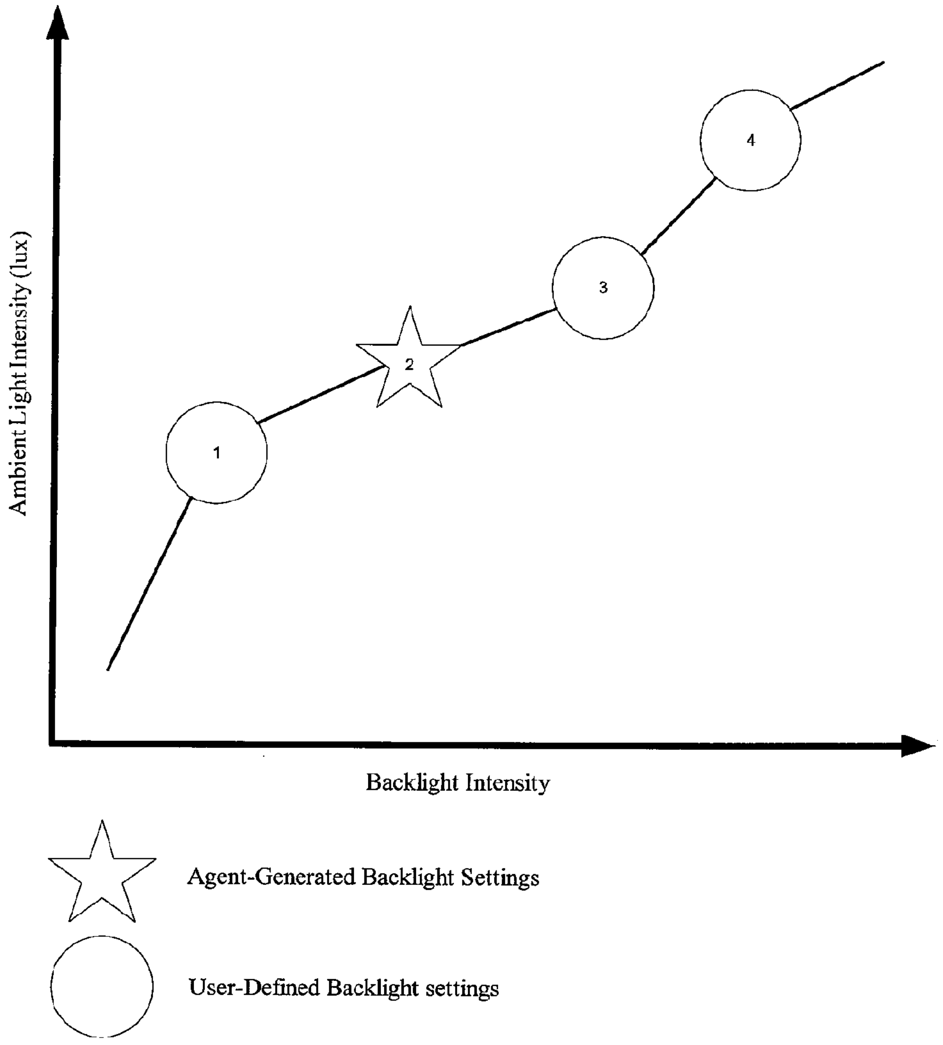
FIG. 4 is a graph illustrating a response curve for backlight settings, in accordance with one embodiment.

In a second mode (e.g., aggressive mode), new backlight settings are determined by interpolating between background settings that are closest to matching the detected ambient light condition (S380), as shown in FIG. 4. The new backlight settings may be added to data structure 195 (S390), and backlight 110 may be adjusted according to the new backlight settings (S340). Interpolated backlight settings may be referred to as agent-generated backlight settings, while backlight settings corresponding to previous adjustments to backlight 110 made by user 150 may be referred to as user-defined backlight settings. Additional interpolation refinements may be possible based on whether the closest backlight settings are agent-generated or user-defined.

In another embodiment, there may be a seeding mode that attempts to minimize power consumption while retaining readability by adding one or more user-specified entries to data table 195. User 150 may be explicitly asked to adjust the backlight settings to the lowest possible readable setting for various ambient light conditions, for example, in the seeding mode.

In yet another embodiment, backlight settings may distinguish between different users. In this scenario, when a change in ambient light is detected, backlight 110 is adjusted according to the current user 150. User A may prefer a brighter setting than user B, for example.

The invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

The logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method of adjusting intensity of illumination of a device based on changes in ambient light, the method comprising:

measuring a first level of ambient light for the device, in response to detecting a change in ambient light;

determining whether the device is in a conservative mode or an aggressive mode;

if the device is in the aggressive mode:

determining whether an association between the first level of ambient light and a first illumination level is recorded in a data structure;

if the association between the first level of ambient light and the first illumination level is recorded in the data structure:

adjusting the intensity of illumination for the device to the first illumination level; and if the association between the first level of ambient light and the first illumination level is not recorded in the data structure:

interpolating a second illumination level corresponding to the first level of ambient light based on values stored in the data structure, wherein the values are associated with illumination levels corresponding to ambient light levels previously recorded in the data structure; and adjusting the intensity of illumination for the device to the second illumination level; and if the device is in the conservative mode:

making no adjustment to the intensity of illumination of the device such that the device remains at an original illumination level; and monitoring user interaction with the device within a threshold period after detecting the change in ambient light to determine whether the user adjusts the intensity of illumination for the device to an adjusted illumination level; and if the user adjusts the intensity of illumination for the device to the adjusted illumination level, recording an association between the adjusted illumination level and the first level of ambient light in the data structure.

2. The method of claim 1, wherein the interpolating the second illumination level is refined based on whether the previously recorded ambient levels resulted from user interaction or a previous interpolation.

3. The method of claim 1, wherein the adjusting of the intensity of illumination for the device to the first illumination level helps save a power resource utilized for illuminating the device.

4. The method of claim 1, further comprising:

monitoring ambient light using an ambient light sensor, wherein a frequency with which data is provided by the ambient light sensor is set by the user.

5. The method of claim 1, wherein determining whether the association between the first level of ambient light and the first illumination level is recorded in the data structure comprises determining whether a lux value of the first level of ambient light is within a preset tolerance of a backlight setting in the data structure.

6. The method of claim 1, wherein the intensity of illumination for the device is utilized for illuminating an LCD screen.

7. The method of claim 1, wherein the intensity of illumination for the device is utilized for illuminating a user interface unit of the device.

8. An automatic intensity of illumination control system for a device comprising:

a logic unit for measuring a first level of ambient light for the device, in response to detecting a change in ambient light;

a logic unit for determining whether the device is in a conservative mode or an aggressive mode;

a logic unit for determining, when the device is in the aggressive mode, whether an association between the first level of ambient light and a first illumination level is recorded in a data structure;

a logic unit for interpolating, when the device is in the aggressive mode and if the association between the first level of ambient light and the first illumination level is not recorded in the data structure, a second illumination level corresponding to the first level of ambient light based on values stored in the data structure, wherein the values are associated with illumination levels corresponding to ambient light levels previously recorded in the data structure;

a logic unit for adjusting an intensity of illumination for the device to the first illumination level, if the association between the first illumination level and the first level of ambient light is recorded in a data structure or to the second illumination level, if the association between the first level of ambient light and the first illumination level is not recorded in the data structure, wherein the logic unit for adjusting the intensity of illumination for the device is further configured to make no adjustment to the intensity of illumination of the device such that the device remains at an original illumination level if the device is in the conservative mode;

a logic unit for monitoring user interaction with the device within a threshold period after detecting the change in ambient light to determine whether the user adjusts the intensity of illumination for the device to an adjusted illumination level; and a logic unit for recording an association between the adjusted illumination level and the first level of ambient light in the data structure if the user adjusts the intensity of illumination for the device to the adjusted illumination level.

9. The system of claim 8, wherein the interpolating the second illumination level is refined based on whether the previously recorded ambient levels resulted from user interaction or a previous interpolation.

10. The system of claim 8, further comprising:

a logic unit for detecting the change in ambient light conditions based on data provided by an ambient light sensor.

* * * * *